United States Patent Office 3,462,330
Patented Aug. 19, 1969

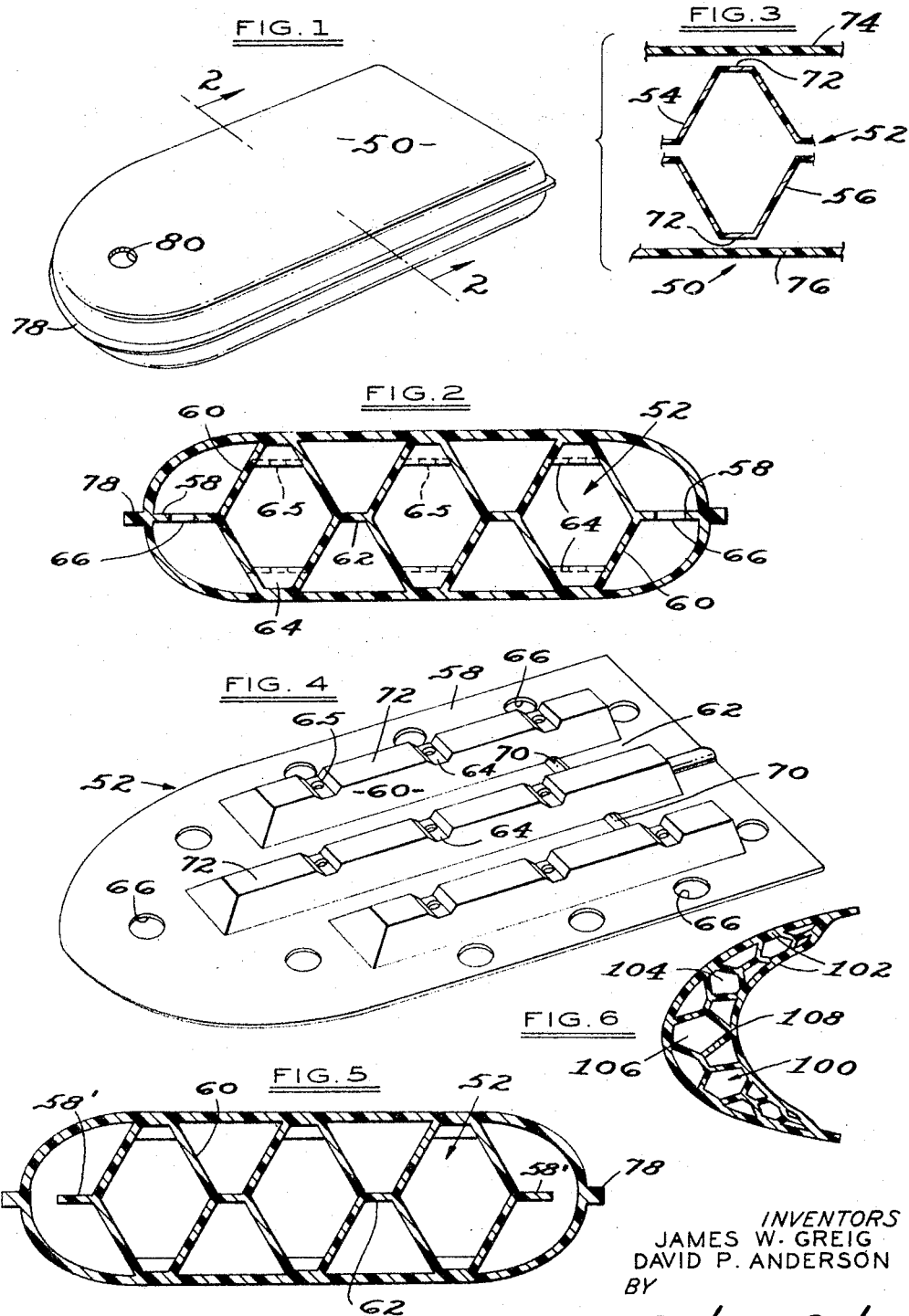

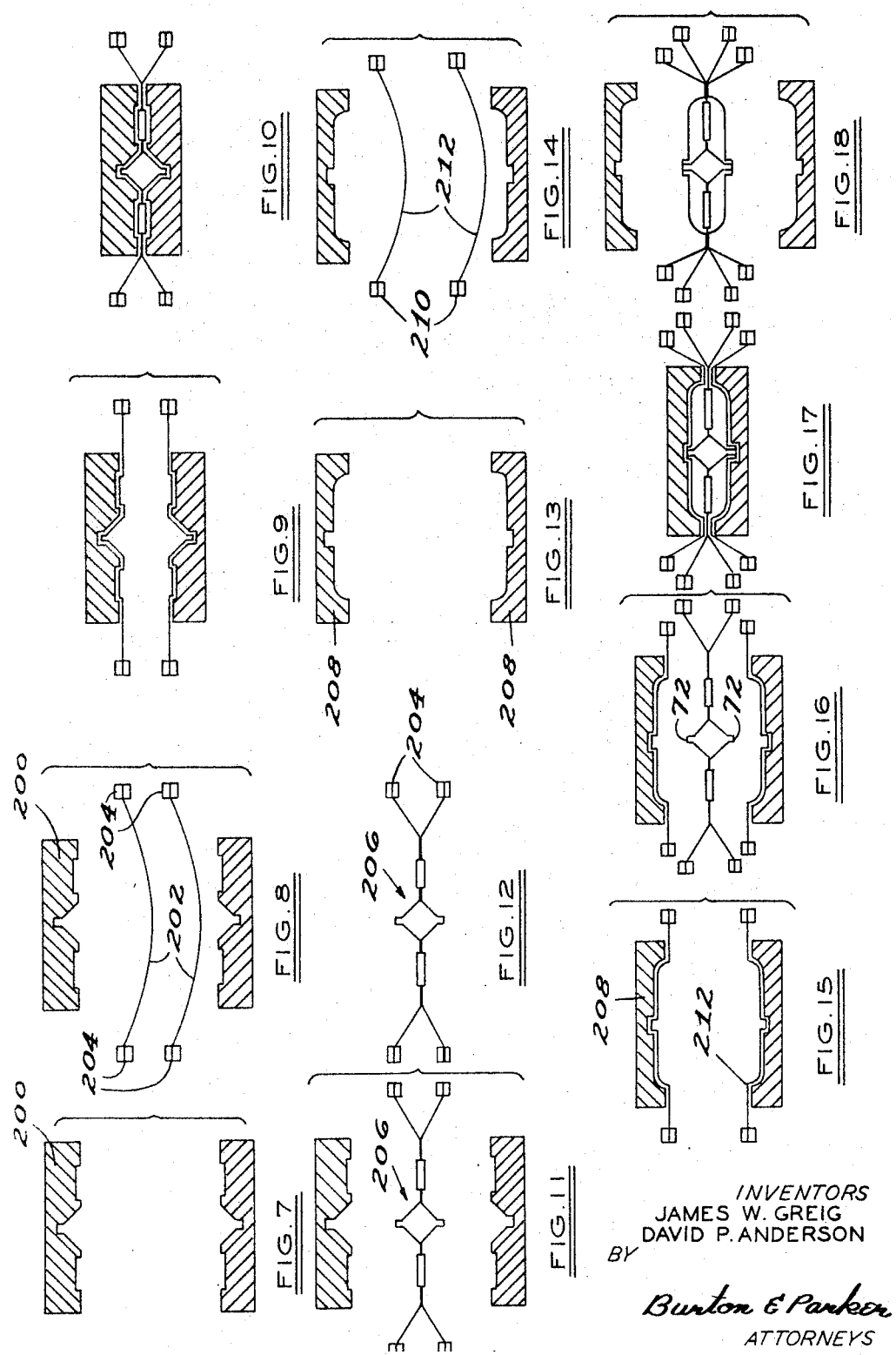

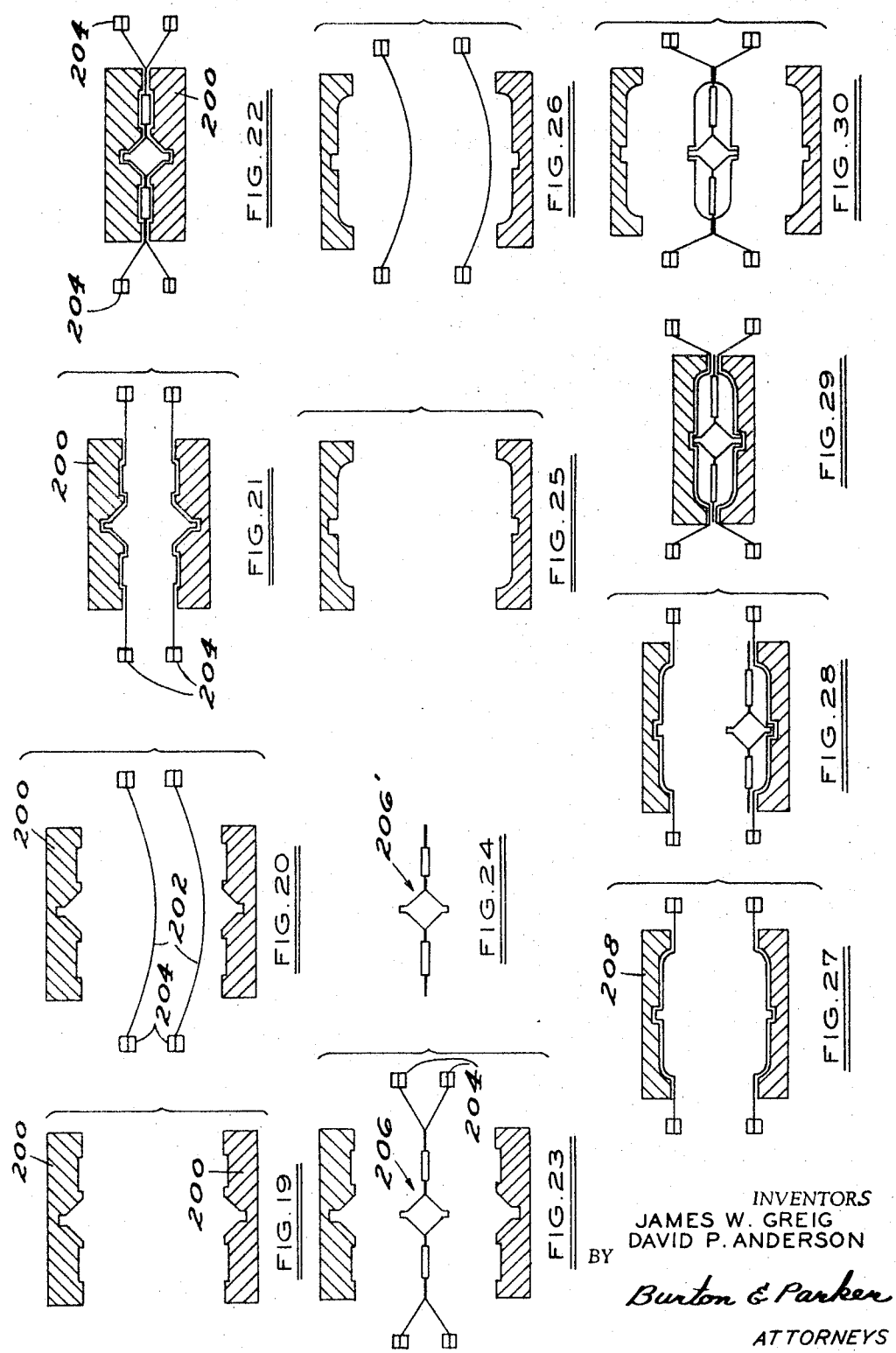

3,462,330
METHOD FOR MAKING A HOLLOW PLASTIC CORE STRUCTURE
James W. Greig, Grosse Pointe Park, and David P. Anderson, Lathrup Village, Mich., assignors to Woodall Industries, Incorporated, Detroit, Mich., a corporation of Michigan
Filed Dec. 9, 1965, Ser. No. 512,639
Int. Cl. B31d 3/02; B29c 17/04
U.S. Cl. 156—197                            3 Claims

ABSTRACT OF THE DISCLOSURE

A method of forming a hollow plastic structure having a plastic core member fused to the plastic skin, or outer plastic sheets. The method includes heating a pair of plastic sheets to their fusion temperature, supporting the heated plastic sheets in spaced relation, forming the sheets against a pair of die faces, disposing a plastic core between the sheets, and closing the die faces to bring predetermined portions of the sheets thus formed into fusion contact with portions of the plastic core, cooling the sheets and separtaing the dies. The core member may be preformed, or formed simultaneously with the outer sheets.

---

This invention relates to an improved hollow plastic structural element, which is adaptable to a wide variety of applications, and to a method of making same.

An object of this invention is to provide an improved plastic structural element which is relatively rigid yet light in weight, and inexpensive to manufacture.

Another object is to provide an improved plastic structure formed of thermoplastic sheets heat-sealed together along opposed boundary margins. The structure thus formed is defined by an outer skin which overlies, and is heat fused to a plastic core, which may be formed concurrently with the plastic skin in a continuous operation, or in a previous separate operation.

More particularly, the plastic structure of this invention is defined by a thermoplastic sheet-like core having oppositely displaced portions with the core disposed between and the oppositely displaced portions thereof heat fused to a pair of outer thermoplastic cover sheets. As herein disclosed the core may be formed of two thermoplastic sheets defining a channel, or a series of channels therebetween, and is heat sealed along opposed boundary margins. Overlying, and heat fused thereto is a plastic skin which may be formed of a pair of thermoplastic sheets heat fused to opposed faces of the plastic core, and fused at its marginal edges to define a channel about the plastic core.

A further object is the provision of a hollow plastic structural shape as hereinabove described, which is light in weight, strong and rugged construction, inexpensive, and the opposed side walls of which may be independently shaped to the desired decorative or structural contour.

One embodiment of the invention herein described relates to automotive crash panels, such as are secured to the forward portion of automotive interiors. In such embodiment the structure is in the form of a hollow panel shaped to conform to the automotive frame. Such structure is eufficiently self-supporting to maintain its contour and impressed shape without additional reinforcement, while possessing sufficient flexibility or energy absorptive characteristics to recover its shape after deformation pressure or impact. The plastic structure of this invention is especially meritorious in this embodiment, because the panel may be designed to yield or collapse on a predetermined impact by varying the design and shape of the plastic core, and by controlling the plastic fusion between the core and the plastic skin.

Another object is therefore to provide an improved energy absorbent plastic structural element which is resilient within a range of impact and pressure forces, and which will yieldably collapse under a predetermined impact loading.

A further object is to provide an improved plastic structural element which may be formed to present a patterned surface in the forming operation of the structure, without the requirement of an additional forming step, or a patterned overlay.

The improved plastic structural element of this invention is capable of supporting many times its own weight, for example, it is sufficiently rugged to be used in floor panels and door panels, yet is inexpensive and light in weight. The disclosed structure is also shock absorbent, which makes it useful in such applications as instrument cases and containers. Further, the structure may be formed into fluid-tight channels or containers, which provide lightweight rugged containers for use as gas tanks and/or fluid conduits. These containers or conduits may be formed with several channels, or provided with an integral insulation chamber without additional forming operations. A variety of other structures may also be made based on the teachings disclosed herein and each may be relatively inexpensive to manufacture and light in weight, yet rugged in construction.

Other objects, advantages and meritorious features will more fully appear from the following description, claims and accompanying drawings, wherein:

FIG. 1 is a perspective view of a hollow plastic structure of the invention, such as a gas tank;

FIG. 2 is a cross-sectional view taken on line 2—2 of FIG. 1;

FIG. 3 is an exploded fragmentary view of the cross section shown in FIG. 2;

FIG. 4 is a perspective view of one embodiment of the core member;

FIG. 5 is a cross-sectional view of another embodiment of the structure shown in FIG. 1;

FIG. 6 is a cross-sectional view of an automotive crash panel embodiment of the invention;

FIGS. 7 to 18 are schematic representations of one method of forming the structure of this invention; and FIGS. 19 to 30 are schematic representations of another method of forming the structure of this invention.

In the fabrication of the embodiments of this invention as shown in FIGS. 1 to 6, the process set forth in copending application, Ser. No. 467,819, filed June 18, 1965, now United States Patent 3,242,245, which is a continuation-in-part application of Ser. No. 69,521, filed Nov. 15, 1960, now abandoned may be used. However, because the structures herein disclosed are provided with a core and are shown as may be formed of four thermoplastic sheets, rather than two as shown in the copending application, the modification of this process is set out in FIGS. 7 to 30.

In FIGS. 1 to 5, there is shown two embodiments of a hollow structure, for example a container, such as an automotive gasoline tank. The structure comprises an outer skin 50 and a core member, referred to generally as 52. The core 52 is formed of two sheets of thermoplastic heat sealed along opposed boundary margins 58. The elements of the basic structure are best shown in an exploded view FIG. 3, wherein the formed upper sheet 54 is brought into fusion contact with the lower sheet 56 while the sheets are maintained at their fusion temperature. The plastic core thus formed is illustrated in FIG. 4, and may be formed concurrently with the plastic skin in a continuous operation, or in a separate operation, as will be described in reference to FIGS. 7 to 30. It is understood that the design of the core member 52, and the skin 50, shown, are illustrative only, and that any core or skin configuration may be used, dependent upon the desired product, and the limitations of the process described.

The core 52, best illustrated in FIG. 4, has a peripheral flange portion 58 which is the fused junction between the upper and the lower sheets. Between these flanges are oppositely displaced portions defining channels 60. Between these channels are inwardly disposed sections 62 which define further areas of fusion between the sheets. Between the indentations 62, are a series of communication vents 64 which provide fluid communication between the outwardly disposed channels 60, and communication vents 65 which provide communication through the channel walls. Communication is provided through the peripheral flange portion 58 by the spaced apertures 66. A pressure inlet 68 is also provided to the center channel, and communication is provided between the hollow interior of the channels by the passages 70, which allow air communication between the sheets (i.e., between the hollow interior of the channels) during the forming operation, which is more fully explained in our copending application, referred to hereinabove.

The oppositely displaced portions 60 of the core define oppositely disposed fusion faces 72, which are fused to the inner surface of the skin, as described hereinbelow. The skin 50 is formed in the same manner as the core 52, that is from a pair of heat fusible plastic sheets, 74 and 76, which are heat sealed at their peripheral margins 78. The plastic sheets of the skin overlie, and are heat fused to the oppositely disposed faces 72 of the core member, forming a substantially unitary plastic structure.

In FIG. 2 the fused peripheral margins 78 of the skin are fused directly to the fused peripheral portion 58 of the core member. In the modification of FIG. 5 the fused peripheral flange portion 58' of the core does not extend into fused engagement with the skin. The structure of FIG. 2 provides somewhat more rigidity in the completed container, however the structure of FIG. 5 has free communication between the channels. The perspective view of the container shown in FIG. 1 illustrates an inlet 80, whose location and configuration would depend upon the function of the container.

FIG. 6 illustrates self-supporting automotive crash panel embodiment of this invention. The panel is formed in the manner herein described, and consists of a core, referred to generally at 100, fused to an outer skin 102. It can be seen that the rigidity of this structure may be varied by employing various designs of plastic cores, and by controlling the fusion between the core and the plastic skin. The structure illustrated employs four hexagonal channels 104 and one pentagonal channel 106. The pentagonal section 106 has only a point contact with the inner surface of the skin at 108, and therefore will be less rigid than the hexagonal sections which provide face to face contact. The rigidity of the core may thus be varied at desired locations, or the rigidity may be varied by the use of other geometric channel configurations. The fusion between the core 100 and the skin 102 may also be varied by controlling the area of the core available for fusion, such as by the use of the communication vents 64, shown in the core of the container in FIG. 4.

Conventional padded automotive crash panels often collapse under the pressures normally encountered in use, or deteriorate with age. Thus, they may be useless at the critical moment of impact. Further, such panels do not provide sufficient resistance to impact to provide adequate protection for the passengers. In the automotive crash panel embodiment of my invention, the impact required to collapse the structure may be varied to provide the optimum protection for a passenger, and the impact and pressure normally encountered in use will not deform the structure. Thus, the panel will maintain its structural integrity for use when it is critically needed.

FIGS. 7 to 18 schematically illustrate one method of forming the structures shown in FIGS. 1 to 6. FIG. 7 shows a pair of opposed core forming dies 200 open to receive pre-heated fusible plastic sheets. The faces of the dies define the configuration of the desired core member. FIG. 8 illustrates a pair of heated plastic sheets 202 supported in spaced relation on a frame means 204. The sheets have been heated to their fusion temperature at a heating station not shown, and will sag under their weight, as shown in FIG. 8. In FIG. 9 the dies have partially closed into forming contact with the plastic sheets, and a vacuum has been drawn through the die faces to form the sheets to the configuration of the die faces. The dies are then fully closed as shown in FIG. 10, while the vacuum is sustained through the die faces. The closing of the dies brings predetermined portions of the heated sheets into fusion contact, forming the hollow core member 206, hereinabove described. At this stage air may be injected between the sheets to sustain the sheets against the die faces during the cooling operation, as through the communication channels 68 and 70 of FIG. 4. After the core has cooled sufficiently to retain its structure, the dies are opened as shown in FIG. 11. The completed core member shown in FIG. 12, is retained in the supporting frame means 204 and transferred to a subsequent molding station, shown in FIG. 16.

FIGS. 13 to 15 represent the initial forming cycle of the outer skin, which is performed concurrently with the molding of the core member at a separate molding station. FIG. 13 represents the skin forming dies 208 open for reception of the thermoplastic sheets. In FIG. 14 the palstic sheets 212 have been received between the die faces, and are supported in spaced relation in the frame means 210. The plastic sheets 212 have been heated to their fusion temperature in a heating station, not shown. FIG. 15 shows the die members 208 partially closed into forming contact with the plastic sheets 212. As described in relation to the forming of the core 206, a vacuum is drawn through the die faces at this point to cause the heated plastic sheets to conform to the configuration of the die faces.

In FIG. 16 the core member 206 has been introduced and positioned for fusion with the outer skin. Because the core has been formed concurrently with the forming of the contour of the outer skin, the core member has been maintained at its fusion temperature, and therefore no additional heating should be required. The dies are then fully closed, as shown in FIG. 17, bringing the opposed peripheral margins of the plastic sheets into fusion contact with the peripheral portions of the core, and the oppositely disposed faces 72 of the core member into fusion contact with the inner surfaces of the skin. In FIG. 18, the dies have been opened after the completed structure has cooled sufficiently to maintain its shape, and the article may be removed from the frame means, and the excess trimmed. It can be seen from FIG. 18 that the peripheral flange portions of the core and the skin have been fused together to provide a substantially homogeneous wall, similar to the structure shown in FIG. 2.

FIGS. 19 to 30 schematically illustrate a forming method which is similar to the process described above, except that the core member is formed in a distinct operation. FIGS. 19 to 23 are identical to the operations shown in FIGS. 7 to 11, and have been numbered accordingly. At this stage of the operation, the core is removed from its supporting frame and trimmed, as shown in FIG. 24 at 206'. The core may now be inspected and stored for future use. FIGS. 25 to 27 shows the forming of the outer skin to the contour of the die faces, which is identical to FIGS. 13 to 15 above. In FIG. 28 the trimmed core member 206' has been introduced and positioned between the sheets defining the outer skin. In a separate station, not shown, the core has been reheated to its fusion temperature, so that when the dies are completely closed, as shown in FIG. 29, the core 206' is fused to the outer skin in the same manner as described in relation to FIG. 17. In FIG. 30 the completed structure is ready to be removed from the dies for subsequent trimming.

The structure formed by the method described in reference to FIGS. 19 to 30 may be of the type shown in FIG. 2 or FIG. 5, because the peripheral fused portion of the core 206′ may be trimmed to extend between the fused area of the skin, or may be trimmed as shown in FIG. 5.

The process described with reference to FIGS. 7 to 18 has the advantage of being a continuous process, and eliminates the necessity of reheating the core 206. However, the machine performing this operation will necessarily be more complex than is required by the process described in relation to FIGS. 19 to 30. This is true because of the two press means that are required to carry out the simultaneous forming of the core and the skin, and the timing and additional size requirements required by the process. The process described in reference to FIGS. 19 to 30 requires only one press, because the dies may be changed for separate runs of the core and the skin. Further, the cores may be easily separately inspected for imperfections prior to the final forming operation.

It can be seen from the structure and method herein described that the final structure is substantially free from stresses, and the areas of fusion have the same structural integrity as the original sheets. Previous structures, which required localized heating or bonding, created areas of stress inherent in the structure, and the bond between the elements could not be adequately controlled, and was seldom complete. Further, subsequent bonding steps are considerably more expensive, and are difficult to carry out in a substantially continuous operation. It should be understood that the structures disclosed herein are illustrative only, and that many other structures can be conceived without departing from the purview of the appended claims. For example, the core may be a single plastic sheet having oppositely displaced surfaces for fusing to the opposite outer skin sheets.

What is claimed is:
1. The method of forming a hollow plastic structure, comprising the steps of:
heating a pair of plastic sheets to their fusion temperature,
supporting the heated plastic sheets at their fusion temperature in spaced relation between a pair of die faces,
shifting the die faces into forming contact with the plastic sheets while maintaining their spaced relation,
drawing a vacuum through the die faces to cause the sheets to conform to the configuration of the die faces,
placing a plastic core having oppositely displaced portions between the formed plastic sheets,
closing the die faces to bring predetermined portions of the plastic sheets thus formed into fusion contact with at least portions of said oppositely disposed portions of the plastic core,
cooling the sheets while maintaining the sheets in contact with the die faces, and
separating the dies and removing the plastic structure therefrom.

2. The method of forming a hollow plastic structure defined in claim 1, wherein the plastic core is formed by shaping a heated thermoplastic sheet to provide said oppositely displaced portions.

3. The method of forming a hollow plastic structure defined in claim 1, wherein the plastic core is formed by the steps of:
heating a pair of plastic sheets to their fusion temperature,
supporting the heated plastic sheets at their fusion temperature in spaced relation between a pair of die faces,
shifting the die faces into forming contact with the plastic sheets,
drawing a vacuum through the die faces to cause the sheets to conforms to the configuration of the die faces,
closing the die faces to bring predetermined portions of the plastic sheets thus formed into fusion contact with each other,
cooling the sheets while maintaining the sheets in contact with the die faces, and
separating the dies and removing the hollow plastic core therefrom.

References Cited
UNITED STATES PATENTS

| | | | |
|---|---|---|---|
| 1,539,869 | 6/1925 | Roberts | 156—285 XR |
| 2,543,879 | 3/1951 | Stuckey | 156—292 XR |
| 2,703,770 | 3/1955 | Melzer | 156—289 XR |
| 2,996,417 | 8/1961 | Wilson | 161—127 XR |
| 3,086,899 | 4/1963 | Smith et al. | 161—131 XR |
| 3,142,599 | 7/1964 | Chavannes | 156—292 XR |
| 3,388,522 | 6/1968 | Lowes | 161—127 XR |

ROBERT F. BURNETT, Primary Examiner
W. A. POWELL, Assistant Examiner

U.S. Cl. X.R.

52—618; 156—210, 267, 285, 292, 306; 161—44, 68, 113, 122, 127; 264—92